(12) United States Patent
Kim

(10) Patent No.: US 12,411,248 B2
(45) Date of Patent: Sep. 9, 2025

(54) METHOD FOR TRACKING LOCATION OF TARGET DEVICE, AND ELECTRONIC DEVICE AND LOCATION TRACKING SERVER FOR PERFORMING SAME

(71) Applicant: Samsung Electronics Co., Ltd., Gyeonggi-do (KR)

(72) Inventor: Kihun Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 403 days.

(21) Appl. No.: 17/947,511

(22) Filed: Sep. 19, 2022

(65) Prior Publication Data

US 2023/0044277 A1     Feb. 9, 2023

Related U.S. Application Data

(63) Continuation of application No. PCT/KR2022/009718, filed on Jul. 6, 2022.

(30) Foreign Application Priority Data

Aug. 9, 2021 (KR) .................. 10-2021-0104701

(51) Int. Cl.
*G01S 19/01*     (2010.01)

(52) U.S. Cl.
CPC .................... *G01S 19/01* (2013.01)

(58) Field of Classification Search
CPC ....... H04W 4/029; H04W 4/025; H04W 4/02; H04W 4/80; H04W 64/00; H04W 12/02;
(Continued)

(56) References Cited

U.S. PATENT DOCUMENTS 9,894,480 B2   2/2018   Chapiewski et al.
2010/0076777 A1   3/2010   Paretti et al.
(Continued)

FOREIGN PATENT DOCUMENTS

CN     105447154 B   5/2019
EP       3333587 A1   6/2018
(Continued)

OTHER PUBLICATIONS

Extended European Search Report dated Jul. 25, 2024.
International Search Report dated Oct. 7, 2022.

*Primary Examiner* — William Kelleher
*Assistant Examiner* — Juliana Cross
(74) *Attorney, Agent, or Firm* — Cha & Reiter, LLC.

(57) ABSTRACT

According to certain embodiments, an electronic device comprises: a communication module configured to perform wireless communication, a location sensor, a processor, and a memory configured to store at least one instruction executable by the processor, wherein execution of the at least one instruction by the processor causes the processor to perform a plurality of operations comprising: receiving, from a tracking target device, a tracking request signal, the tracking request signal comprising identification information of a tracking target device via the communication module, obtaining location information of the electronic device via the location sensor, and transmitting, to a location tracking server, the identification information of the tracking target device and only one of latitude information and longitude information comprised in the location information via the communication module.

16 Claims, 9 Drawing Sheets

(58) Field of Classification Search
CPC ... H04W 88/02; H04L 67/52; H04M 1/72457; G01S 5/0263; G01S 5/0295; G01S 19/13; G01S 5/0072; G01S 5/0284; G01S 5/0289; G01S 5/0236; G01S 19/01
See application file for complete search history.

(56) References Cited

U.S. PATENT DOCUMENTS

| | | | |
|---|---|---|---|
| 2017/0142551 A1* | 5/2017 | Chapiewski | H04W 4/023 |
| 2020/0178039 A1* | 6/2020 | Lee | H04W 4/029 |
| 2020/0221254 A1 | 7/2020 | Farley et al. | |

FOREIGN PATENT DOCUMENTS

| | | |
|---|---|---|
| JP | 2013-118433 A | 6/2013 |
| KR | 10-0546473 B1 | 1/2006 |
| KR | 10-0750380 B1 | 8/2007 |
| KR | 10-0939731 B1 | 1/2010 |
| KR | 101042113 B1 | 6/2011 |
| KR | 10-1268574 B1 | 5/2013 |
| KR | 10-1708112 B1 | 2/2017 |
| KR | 102284734 B1 | 8/2021 |
| WO | 2017/083102 A1 | 5/2017 |
| WO | 2019/145497 A1 | 8/2019 |

* cited by examiner

```
Data {
    PrivacyId: ABCDEFG
    latitude: 37.2588296
    longitude: null
    time: 2021-07-20,09:20
}
```

FIG. 6A

```
Data {
    PrivacyId: ABCDEFG
    latitude: null
    longitude: 127.056289
    time: 2021-07-20,09:25
}
```

FIG. 6B

METHOD FOR TRACKING LOCATION OF TARGET DEVICE, AND ELECTRONIC DEVICE AND LOCATION TRACKING SERVER FOR PERFORMING SAME

CROSS-REFERENCE TO RELATED APPLICATIONS

This application is a continuation application of a national stage application of International Application No. PCT/KR2022/009718 designating the United States, filed on Jul. 6, 2022, at the Korean Intellectual Property Receiving Office and claims priority to Korean Patent Application No. 10-2021-0104701, filed on Aug. 9, 2021, at the Korean Intellectual Property Office, the disclosures of which are incorporated by reference herein in their entireties.

BACKGROUND

1. Field

The disclosure relates to a technology for tracking a location of a target device.

2. Description of Related Art

As electronic devices are taking an increasing important in our daily lives, losing an electronic device can be quite inconvenient, if not problematic. Research on technologies for locating a lost electronic device is being actively conducted. Among the technologies is a method of tracking a location using a wireless local area network (WLAN) signal of an access point (AP). In this location tracking method, the electronic device receives a global positioning system (GPS) wave signal. If an AP is scanned, the location from the GPS wave signal, or the GPS wave signal, itself, are transmitted to a server using the scanned AP. The server transmits the location information corresponding to the received GPS wave signal to a user account of the lost electronic device.

Using an adjacent mobile terminal to receive a tracking request from the tracking target device and transmit location information can also have limitations. For example, the user of the adjacent terminal may be reluctant to provide the location information because the location information also suggests the user's location. Even worse, a lost tracking target device can be used as a pretext for tracking the user of the adjacent terminal.

SUMMARY

According to certain embodiments, an electronic device comprises: a communication module configured to perform wireless communication; a location sensor; a processor; and a memory configured to store at least one instruction executable by the processor, wherein execution of the at least one instruction by the processor causes the processor to perform a plurality of operations comprising: receiving, from a tracking target device, a tracking request signal, the tracking request signal comprising identification information of a tracking target device via the communication module; obtaining location information of the electronic device via the location sensor; and transmitting, to a location tracking server, the identification information of the tracking target device and only one of latitude information and longitude information comprised in the location information via the communication module.

According to certain embodiments, a method of tracking a location of a tracking target device, performed by an electronic device, comprises: receiving, from the tracking target device, a tracking request signal comprising identification information of the tracking target device; obtaining location information of the electronic device using a location sensor; and transmitting, to a location tracking server, the identification information of the tracking target device and only one of latitude information and longitude information comprised in the location information.

According to certain embodiments, a method of tracking a location of a tracking target device, performed by a location tracking server, comprises: collecting, from electronic devices configured to receive a tracking request signal from the tracking target device, identification information of the tracking target device and partial location information of the electronic devices; and estimating a location of the tracking target device based on the collected identification information and the partial location information, wherein the partial location information comprises any one of latitude information and longitude information of each of the electronic devices, and the estimating of the location of the tracking target device comprises estimating a latitude and a longitude at which the tracking target device is located based on latitude information or longitude information received from each of the electronic devices.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIGS. 6A and 6B are diagrams illustrating information transmitted to a location tracking server from an electronic device according to an embodiment.

DETAILED DESCRIPTION

Figure 1A:
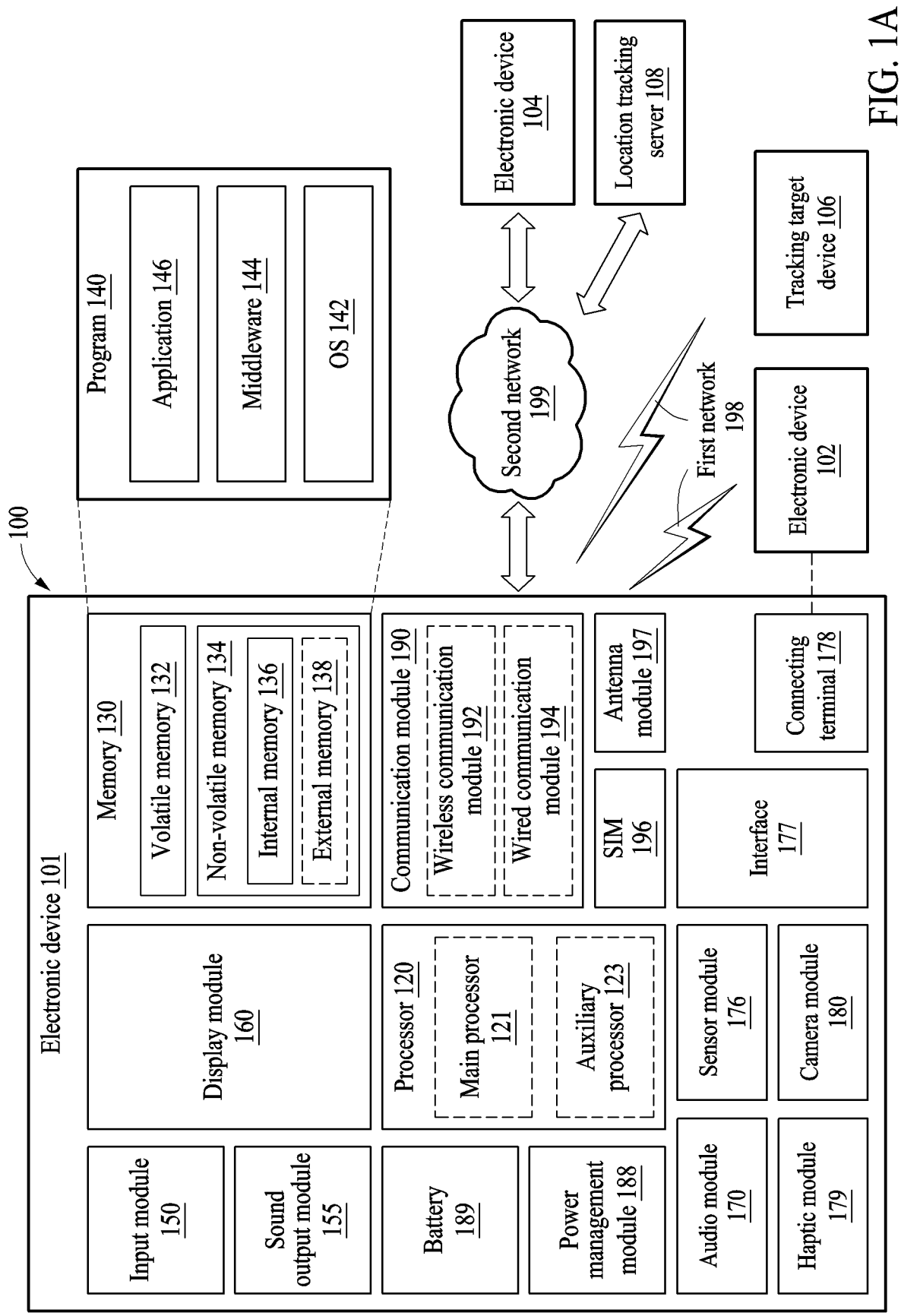
FIG. 1A is a block diagram illustrating an example electronic device in a network environment according to various embodiments.

Hereinafter, embodiments will be described in detail with reference to the accompanying drawings. When describing the embodiments with reference to the accompanying drawings, like reference numerals refer to like elements and any repeated description related thereto will be omitted.

According to certain embodiments, it may be possible to alleviate a user's concern about providing precise location information of an adjacent electronic device to track a location of a tracking target device.

In addition, according to certain embodiments, as an adjacent electronic device transmits any one of its latitude information and longitude information to a server, a user of the adjacent electronic device may less worried about providing their location. Accordingly, it may be possible to perform location tracking of a target device more accurately and smoothly.

In addition, according to certain embodiments, personal information including precise location information of an adjacent electronic device is not collected. Accordingly, it may be possible to protect the personal information of a user of the adjacent electronic device.

Further, according to certain embodiments, it may be possible to prevent a location tracking function for a tracking target device from being misused.

Moreover, an increased number of adjacent electronic devices providing information in response to tracking request of a tracking target device may improve accuracy.

Also, according to certain embodiments, an adjacent electronic device may transmit less data by transmitting only one of latitude information and longitude information of the adjacent electronic device instead of transmitting both the latitude information and longitude information of the adjacent electronic device.

In addition, various effects directly or indirectly ascertained through the present disclosure may be provided.

FIG. 1A describes electronic devices 101, 102, and 104 that can track a tracking target device 106 and provide information to a location tracking server 108. The electronic device 101 will be described in more detail.

According to certain embodiments, electronic device 101 in the vicinity of tracking target device 106, may only transmit a portion of the location information, that by itself is geometrically ambiguous. For example, a latitude coordinate, by itself, is geometrically ambiguous in that, while it does confine the location along a circle about the earth, it is ambiguous as to what point of the circle. Another electronic device 102 adjacent to tracking target device 106 can also transmit a portion of the location information that is also geometrically ambiguous, but along with the portion of the location information from the electronic device 101, provides an unambiguous location. For example, longitude information, by itself is also geometrically ambiguous, but along with latitude information, provides an unambiguous location. As a result, if the communication of the latitude information from the electronic device 101 is intercepted, the latitude, alone, will not meaningfully indicate a location. The same is true for the electronic device 102. The foregoing is only by way of example, and not limitation.

In another embodiment, the electronic device 101 can provide its distance from only a first GPS satellite, electronic device 102 can provide its distance from only a second GPS satellite, and electronic device 104 can provide its distance from a third GPS satellite. A distance from only one GPS satellite is geometrically ambiguous in that there is large circle about the surface of the earth that have the same distance from the GPS satellite. However, along with the distance from a second GPS satellite, and a third GPS satellite, the location can be unambiguously determined.

Electronic Device

FIG. 1A is a block diagram illustrating an electronic device 101 in a network environment 100 according to various example embodiments. Referring to FIG. 1A, in the network environment 100, the electronic device 101 may communicate with an electronic device 102 or a tracking target device 106 via a first network 198 (e.g., Bluetooth communication, a short-range wireless communication network, infrared data association (IrDA)), or communicate with at least one of an electronic device 104 or a location tracking server 108 via a second network 199 (e.g., a long-range wireless communication network). It is noted that the target tracking device 106 can be identical to the electronic device 101, but for the fact that the target tracking device 106 is seeking to be tracked.

For example, the user of tracking target device 106 an electronic device which the user may have misplaced or lost. Accordingly, the location of the tracking target device 106 can be determined by other electronic devices 101, 102, and 104 that are in the vicinity of the tracking target device 106. While the tracking target device 106, as well electronic devices 101, 102, and 104 can be identical to one another, the device that is sought to be tracked will be referred to as the tracking target device 106 to distinguish it from electronic devices 101, 102, and 104.

The electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The term "processor" shall be understood to refer to both the singular and plural contexts in this disclosure.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server. Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but examples of which are not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include at least one instruction executable by the processor 120. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a record.

The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an embodiment, the display module 160 may include a touch sensor adapted to sense a touch, or a pressure sensor adapted to measure an intensity of a force incurred by the touch.

The audio module 170 may convert a sound into an electric signal or vice versa. According to an embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an embodiment, the sensor module 176 may include, for example, a location sensor, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor. The location sensor may include a global navigation satellite system (GNSS) sensor capable of measuring a latitude and a longitude of the electronic device 101. In one embodiment, the GNSS sensor may support a satellite navigation system based on a global positioning system (GPS), a global navigation satellite system (GLONASS), Galileo, Beidou, a quasi-zenith satellite system (QZSS), and navigation Indian constellation (NAVIC).

The location sensor of the sensor module 176 can, determine the latitude and longitude of the location of the electronic device 101.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, the tracking target device, or the location tracking server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) that performs wireless communication or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or IrDA or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to certain embodiments, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via a server (e.g., the location tracking server 108) coupled with the second network 199. Each of the external electronic devices 102 or 104 may be a device of the same type as or a different type from the electronic device 101. According to an embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device.

The electronic device according to certain embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that certain embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to an embodiment, in response to at least one instruction stored in the memory 130 being executed by the processor 120, the processor 120 may receive a tracking request signal from the tracking target device 106 via the communication module 190, obtain location information of the electronic device 101 via a location sensor included in the sensor module 176, and transmit any one of latitude information and longitude information included in the location information to the location tracking server 108 via the communication module 190.

The tracking target device 106 may continually broadcast the tracking request signal via short-range wireless communication (e.g., Bluetooth communication, and IrDA). The tracking target device 106 may include, for example a tag device (e.g., a smart tag), a tile device, a wearable device, and a mobile device (e.g., a smartphone, or a table computer), but examples are not limited thereto, and any device capable of transmitting the tracking request signal via short-range communication may correspond to the tracking target device 106. The tracking request signal may include identification information of the tracking target device 106.

The processor 120 may obtain latitude information and longitude information indicating where the electronic device 101 is located via a GNSS sensor included in the sensor module 176 in response to a reception of the tracking request signal.

The processor 120 may determine only a portion of the location information to be transmitted to the location tracking server 108. The portion of the location information may be, by itself, is geometrically ambiguous, but together with the remainder of the location information, provide an unambiguous location. Other electronic device(s) 102, 104 may transmit the remainder of the location information. Thus, the location tracking server 108 can unambiguously determine the location of the tracking target device 106. Even if a signal from any one of the electronic devices 101, 102, and 104 is intercepted by a malicious party, the portion of the location information would not meaningfully provide the location of the electronic device.

In certain embodiments, only one from among latitude information and longitude information is transmitted. Only one of the latitude and longitude information is geometrically ambiguous without the other of the latitude and longitude information. The specific one of the latitude and longitude information can be based on setting information. The setting information can be related to providing location information of the electronic device 101. In response to the mode of the setting information being set to a random provision mode, the processor 120 may randomly select only one of the latitude information and the longitude information as the portion of the location information to be transmitted to the location tracking server 108.

In another embodiment, the electronic device 101 may provide only its distance from only one GPS satellite. During GPS positioning, the electronic device 101 determines a time delay of signals transmitted from four visible GPS satellites. Based on the time delays of the signals, the electronic device 101 can determine a time measuring error between the clock of the electronic device 101 and atomic clock-based time of the GPS satellites. Based on the timing error and the measured time delay between the electronic device 101 and one of the GPS satellites, the electronic device 101 can determine the distance between itself and the GPS satellite. Accordingly, the distance from only one of the GPS satellites (along with an identification of the GPS satellite) can be provided to the location tracking server 108. The distance from only one of the GPS satellites without the distance from any of the other GPS satellites is geometrically ambiguous.

The processor 120 may extract identification information of the tracking target device 106 from the tracking request signal from the tracking target device 106. The processor 120, via communication module 190 can transmit, to the location tracking server 108, the identification information of the tracking target device 106, the portion of the location information of the electronic device 101, and the time (or information indicating the time) when the portion of the location information is obtained.

In response to a reception of a request from the location tracking server 108, the processor 120 may determine whether which one of the latitude information or the longitude information to transmit to the location tracking server 108 based on setting information. The setting information can be related to providing location information. In response to the setting information being set to a random provision mode, the processor 120 may transmit a randomly selected only one of the latitude information or the longitude information to the location tracking server 108. Alternatively, the processor 120 may transmit, to the location tracking server 108, a distance from a randomly selected GPS satellite if the setting is set to a random provision mode. If the setting information is set such that only longitude information is transmitted and a request to transmit latitude information is received from the location tracking server 108, or if the setting information is set such that only latitude information is transmitted and a request to transmit longitude information is received from the location tracking server 108, the processor 120 may decline the request.

Figure 1B:
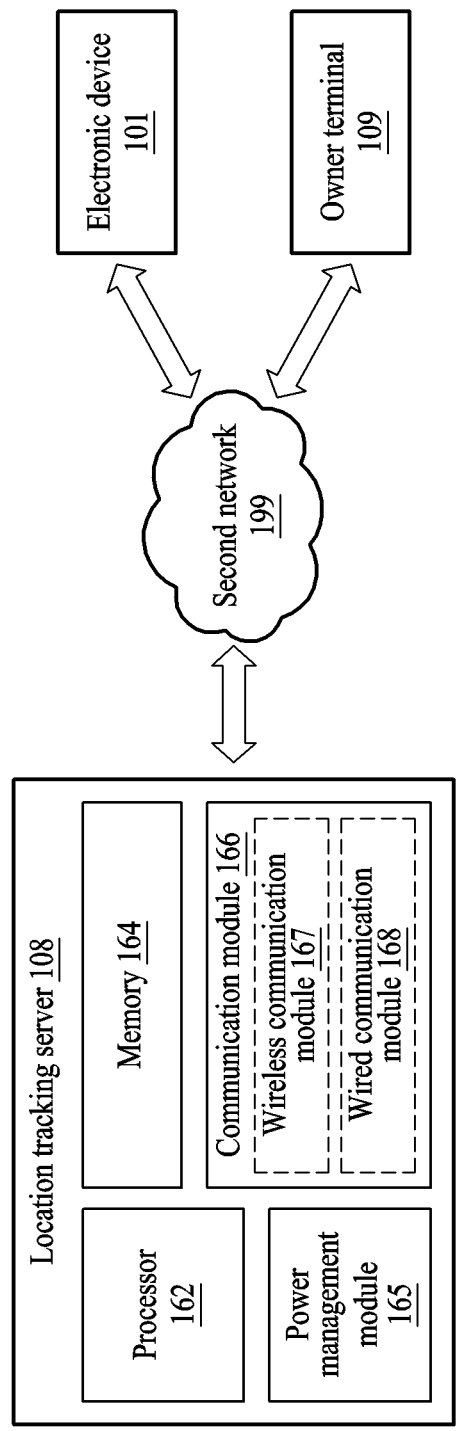
FIG. 1B is a block diagram illustrating an example location tracking server according to various embodiments.

FIG. 1B is a block diagram illustrating the location tracking server 108 according to certain embodiments.

Referring to FIG. 1B, the location tracking server 108 may track a location of a tracking target device (e.g., the tracking target device 106 of FIG. 1A). The electronic device 101 located near the tracking target device may receive a tracking request signal from the tracking target device. The electronic device 101 that receives the tracking request signal may provide partial (or a portion of) location information to the location tracking server 108 via the second network 199. The partial location information or the portion of the location information is geometrically ambiguous by itself.

The specific portion of the location information can be determined according to setting information related to providing location information. For example, the electronic device 101 may transmit any one, but only one of the latitude information and longitude information to the location tracking server 108 according to the setting information. Alternatively, the electronic device 101 can transmit the distance between itself and only one GPS satellite, and an identification of the GPS satellite, to the location tracking server 108. The location tracking server 108 may collect the portions of the location information of electronic devices in the vicinity of the tracking target device from a plurality of electronic devices. In response to receiving a request to track the tracking target device from the owner terminal 109 of the tracking target device, the location tracking server 108 may estimate a latitude and a longitude at which the tracking target device is located by combining collected location information of the tracking target device and may transmit information on the estimated latitude and longitude of the tracking target device to the owner terminal 109 via the second network 199.

According to an embodiment, the location tracking server 108 may include a processor 162, a memory 164, a power management module 165, and a communication module 166. The communication module 166 may include a wireless communication module 167 and a wired communication module 168. In some embodiments, at least one of these components (e.g., the wired communication module 168 or the power management module 165) may be omitted, or one or more other components may be added to the location tracking server 108.

The processor 162 may execute, for example, software to control at least one other component (e.g., a hardware or software component) of the location tracking server 108 connected to the processor 162 and perform various types of data processing or operations. According to an embodiment, as at least a part of data processing or computation, the processor 162 may store a command or data received from another component (e.g., the communication module 166) in the memory 164, process the command or the data stored in the memory 164, and store resulting data in the memory 164. The processor 162 may include, for example, a CPU, an AP, a GPU, an NPU unit, a sensor hub processor, or a communication processor. In response to at least one instruction stored in the memory 164 being executed by the processor 162, the processor 162 may collect location information of electronic devices related to a location of a tracking target device from the above-described plurality of devices and perform an operation of estimating the location of the tracking target device based on the collected location information.

The memory 164 may store various data used by at least one component (e.g., the processor 162) of the location tracking server 108. The various data may include, for example, software for an operation of the location tracking server 108 and input data and/or output data for a command related thereto. The memory 164 may include a volatile memory or a non-volatile memory.

The power management module 165 may manage power supplied to the location tracking server 108. According to an embodiment, the power management module 165 may be implemented as, for example, at least a part of a PMIC.

The communication module 166 may support establishing a direct (e.g., wired) communication channel or a wireless communication channel between the location tracking server 108 and the external electronic device (e.g., the electronic device 101, or the owner terminal 109) and performing communication via the established communication channel.

According to an embodiment, the communication module 166 may include the wireless communication module 167 (e.g., a cellular communication module, a short-range wireless communication module, or a GNSS communication module) or the wired communication module 168 (e.g., a LAN communication module or a power line communication module).

Figure 2:
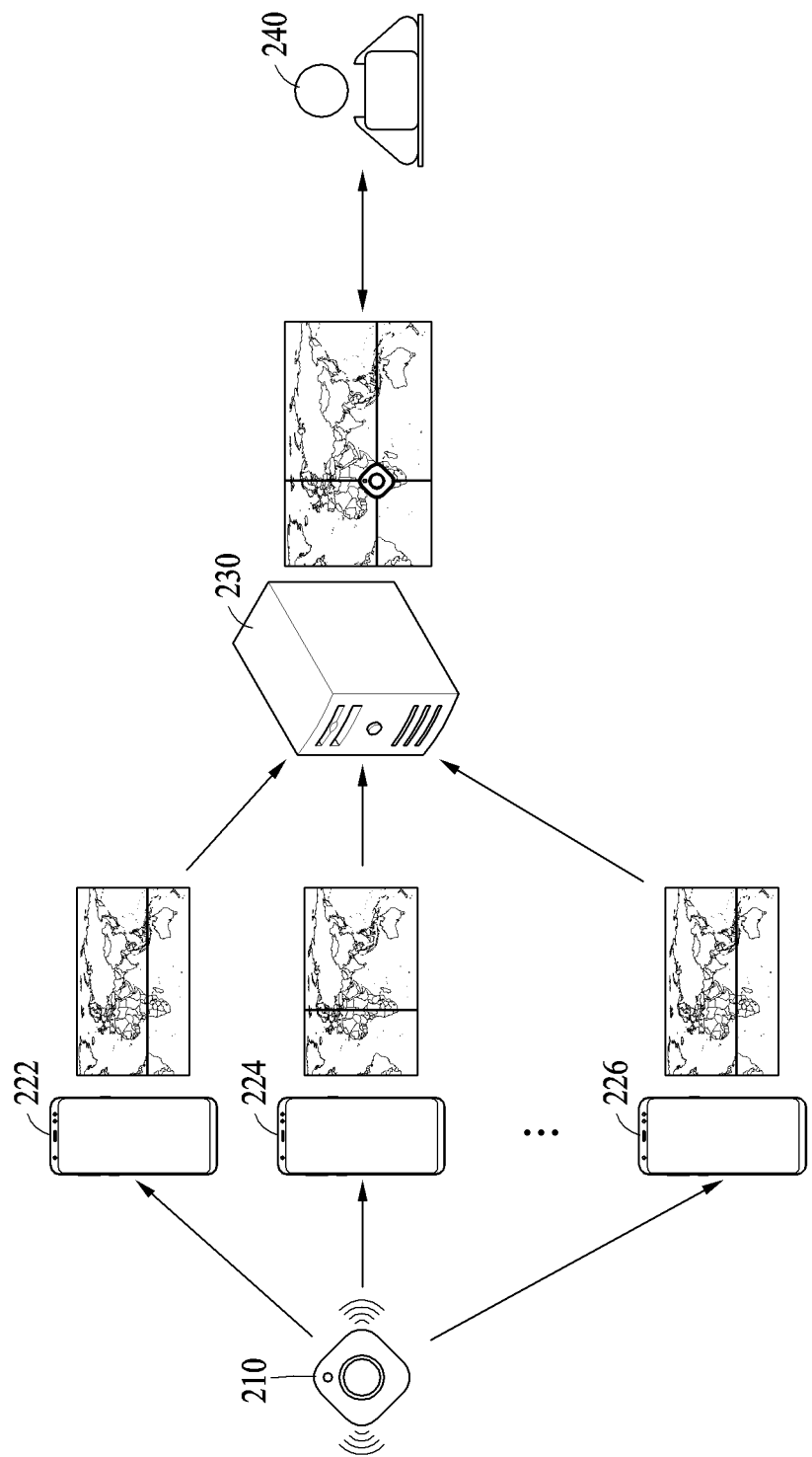
FIG. 2 is a diagram illustrating an example of tracking location information of a tracking target device according to an embodiment.

FIG. 2 is a diagram illustrating an example of tracking location information of a tracking target device according to an embodiment.

Referring to FIG. 2, a tracking target device 210 (e.g., the tracking target device 106 of FIG. 1A) may transmit a tracking request signal. It is noted that although the tracking target device is shown as a different device from the electronic devices 222, 224, and 226, it can be identical. It is noted that the tracking target device 210 can be affixed to another item, such as, but not limited to, valuables. The tracking target device 210 may radiate (e.g., broadcast) a tracking request signal to surroundings via, for example, Bluetooth communication (e.g., Bluetooth Low Energy). The tracking request signal may include identification information indicating a unique identifier (ID) (e.g., an ID) of the tracking target device 210 and a request for adjacent devices to provide location information. The tracking request signal may include a lost signal to notify the surroundings that the tracking target device 210 is lost.

Electronic devices 222, 224, and 226 located near the tracking target device 210 may receive the tracking request signal transmitted by the tracking target device 210. The electronic devices 222, 224, and 226 may simultaneously receive the tracking request signal radiated from the tracking target device 210. The electronic devices 222, 224, and 226 that receive the tracking request signal may obtain location information. The location information can indicate a latitude and a longitude at which the electronic devices are located. The electronic devices 222, 224, 226 can obtain the location information using a location sensor such as GNSS in response to receiving the tracking request signal.

The electronic devices 222, 224, and 226 may identify setting information related to providing location information. Based thereon, the electronic devices 222, 224, and 226 can transmit the identification information for a unique ID of the tracking target device 210 and partial (or a portion of) location information of the electronic devices 222, 224, and 226 to the location tracking server 230. The partial location information or the portion of the location information is, by itself, geometrically ambiguous about the location of the electronic device 222, 224, and 226.

In certain embodiments, the electronic devices 222, 224, and 226 may transmit either, longitude coordinates or latitude coordinates, but not both, of the electronic devices, to the location tracking server 230. The setting information related to providing location information may include information on which mode is selected from among, for example, a longitude information provision mode in which only longitude information is provided, a latitude information provision mode in which only latitude information is provided, and a random provision mode in which any randomly selected one of latitude information and longitude information is provided to provide location information. In the random provision mode, a technique of transmitting latitude information or longitude information depending on a current time may be used. For example, if a number representing an hour, minute, or second is an odd number, latitude information may be transmitted, and if a number representing an hour, minute, or second is an even number, longitude information may be transmitted. However, examples are not limited thereto. For example, if a random number is an odd number, latitude information may be transmitted, and if a random number is an even number, longitude information may be transmitted.

The above-described provision mode included in the setting information may be selected by a user. In an embodiment, there may be a setting menu related to a function of tracking the locations of the electronic devices 222, 224, and 226. Users of the electronic devices 222, 224, and 226 may select any one mode from among the latitude information provision mode, the longitude information provision mode, and the random provision mode via the setting menu. Setting information for a selected provision mode is stored, and location information to be transmitted to the location tracking server 230 may be determined according to the stored setting information when the electronic devices 222, 224, and 226 provide part of their location information to the location tracking server 230.

In an embodiment, in response to the mode of the setting information of both the electronic device 222 and electronic device 226 being set to latitude information provision mode in which only the latitude information of their location information is provided, the electronic device 222 and the electronic device 226 may respectively transmit their latitude information and not transmit their longitude information to the location tracking server 230. In response to the mode of the setting information of the electronic device 224 being set to longitude information provision mode in which only longitude information of its location information is provided, the electronic device 224 may transmit its longitude information and not transmit its latitude information to the location tracking server 230. Therefore, the electronic devices 222, 224, and 226 that help track a location of the tracking target device 210 may select and transmit any one of longitude information and latitude information to the location tracking sever 230. Providing only partial (or a portion of) location information, which is, by itself, geometrically ambiguous, instead of precise location information of the electronic devices 222, 224, and 226 to track the location of the tracking target device 210, users of the electronic devices 222, 224, and 226 may be more willing to allow a portion of their location information to be collected.

The location tracking server 230 (e.g., the location tracking server 108 of FIGS. 1A and 1B) may store the partial (or portions) location information received from the electronic devices 222, 224, and 226. The partial location information or portions of the location information, when combined, unambiguously provides a location. Accordingly, the location tracking server can estimate the location of the tracking target device 210 based on the collected partial (or portions of) location information. The electronic devices 222, 224, and 226 may continually transmit part of their location information to the location tracking server 230 while receiving the tracking request signal from the tracking target device 210, and the location tracking server 230 may continue to collect partial location information received from the electronic devices 222, 224, and 226.

The location tracking server 230 may provide estimated location of the tracking target device 210 to an owner (or an owner terminal (e.g., the owner terminal 109 of FIG. 1B)) 240 of the tracking target device 210. The owner 240 of the tracking target device 210 may directly access the location tracking server 230, make a request to track the location of the tracking target device 210 stored in the location tracking server 230 via a designated application, or make an inquiry about the location of the tracking target device 210.

In response to receiving a request (or an inquiry) to track the location of the tracking target device 210 from the owner 240 of the tracking target device 210, the location tracking server 230 may estimate a latitude and a longitude at which the tracking target device 210 is located based on the partial location information collected from the electronic devices 222, 224, and 226 to provide location information of the estimated latitude and longitude to the owner 240 of the tracking target device 210. A distance between the tracking target device 210 and each of the electronic devices 222, 224, and 226 is close enough that a location derived from the location information of the electronic devices 222, 224, and 226 may be considered as the location of the tracking target device 210.

Figure 3:
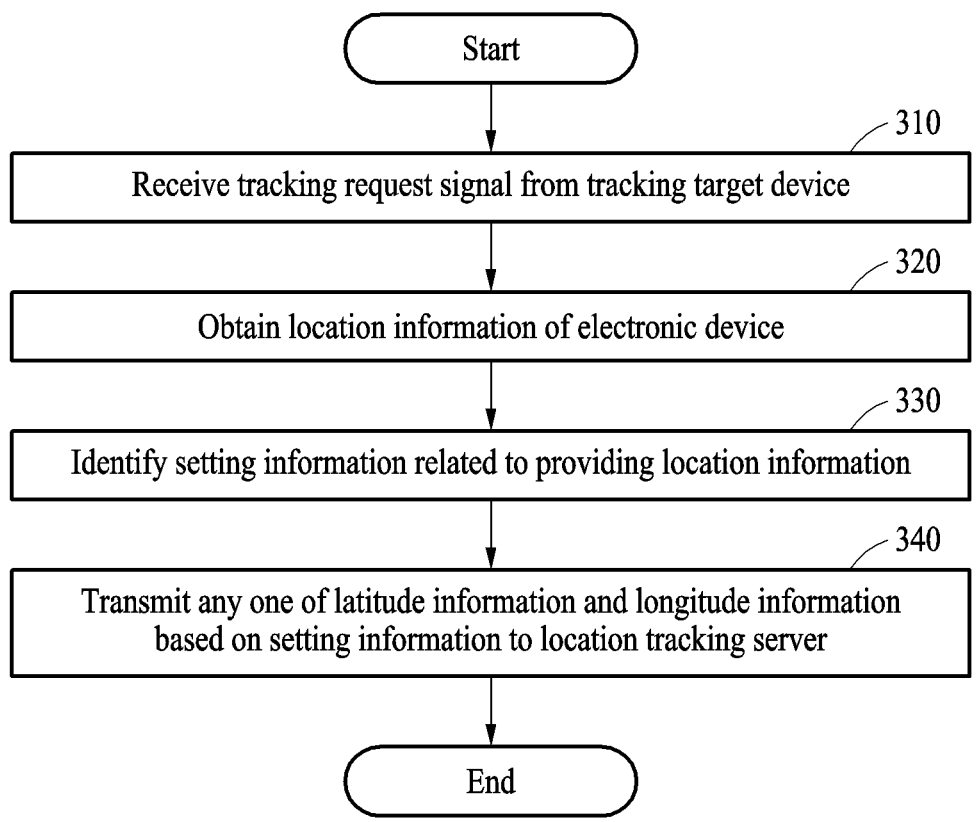
FIG. 3 is a flowchart illustrating example operations of a method of tracking a location of a tracking target device performed by an electronic device according to an embodiment.

FIG. 3 is a flowchart illustrating example operations of a method of tracking a location of a tracking target device performed by an electronic device according to an embodiment.

In the following embodiments, operations may be performed sequentially, but not necessarily sequentially. For example, the order of the operations may change, and the operations may be performed in parallel. Operations 310 to 340 may be performed by at least one component (e.g., the processor 120 of FIG. 1A) of the electronic device (e.g., the electronic device 101 of FIG. 1A).

In operation 310, the electronic device may receive a tracking request signal including identification information of a tracking target device from a tracking target device (e.g., the tracking target device 106 of FIG. 1A).

In operation 320, the electronic device may obtain location information of the electronic device using a location sensor. The electronic device may obtain latitude information and longitude information of the electronic device using, for example, a GNSS sensor. The electronic device may extract identification information including an ID of the tracking target device from the tracking request signal.

In operation 330, the electronic device may identify setting information related to providing location information. In an embodiment, the setting information may include information on which mode is selected from among a latitude information provision mode in which only latitude information is provided, a longitude information provision mode in which only longitude information is provided, and a random provision mode in which any one of latitude information and longitude information is randomly selected and provided.

In operation 340, the electronic device may transmit only a portion of the location information that is, by itself, geometrically ambiguous, with the remainder of the location information, unambiguous. For example, the electronic device may transmit only one of latitude information and longitude information and the identification information of the tracking target device to a location tracking server (e.g., the location tracking server 108 of FIG. 1A). The electronic device may determine location information to be transmitted to the location tracking server from among latitude information and longitude information based on setting information related to providing location information of the electronic device. The electronic device may transmit, to the location tracking server, latitude information indicating where the electronic device is located in response to the mode of the setting information being set to latitude information provision mode, and the electronic device may transmit longitude information indicating where the electronic device is located in response to the mode of the setting information being set to the longitude information provision mode. In response to the mode of the setting information being set to the random provision mode, the electronic device may determine any randomly selected one of latitude information and longitude information as the location information to be transmitted to the location tracking server.

Alternatively, the electronic device can transmit its distance from only one GPS satellite.

The electronic device may transmit, to the location tracking server, transmission data including the location information (e.g., any one of latitude information and longitude information) to be transmitted to the location tracking server, the extracted identification information of the tracking target device, and time information indicating a time when the location information is obtained.

The descriptions referring to FIGS. 1A to 2 may apply to the operations illustrated in FIG. 3, and thus further detailed descriptions are not provided.

Figure 4:
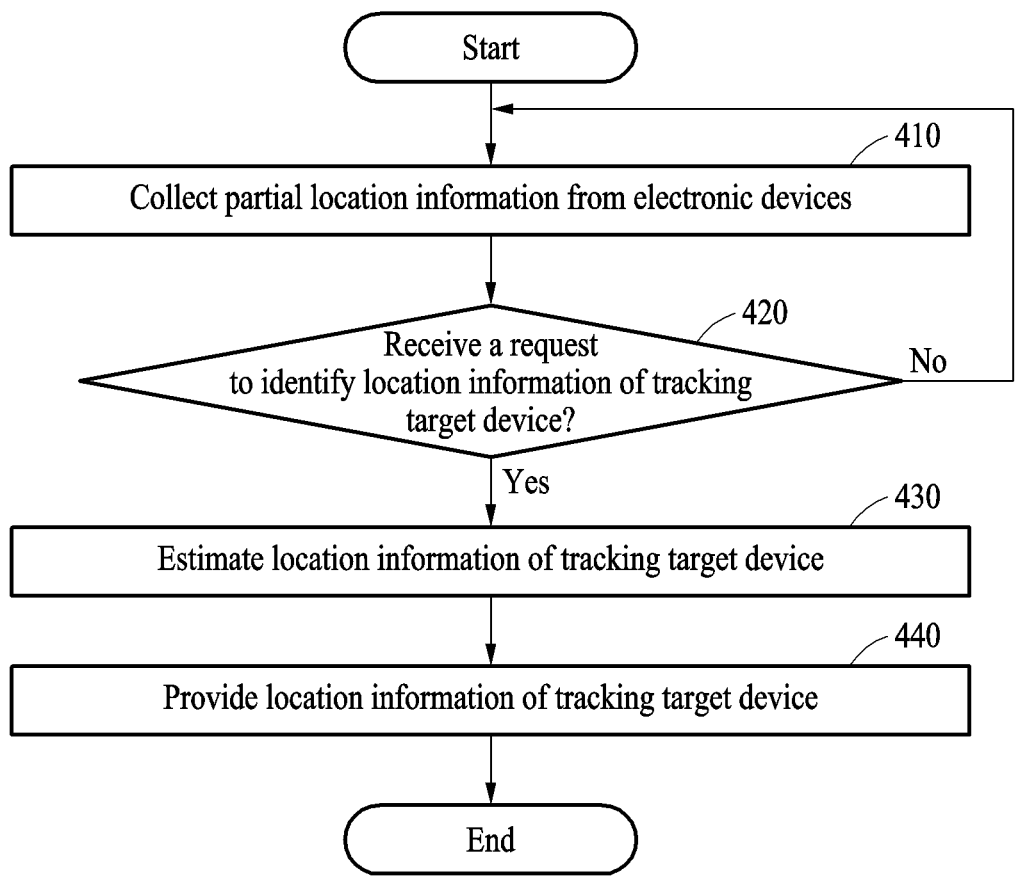
FIG. 4 is a flowchart illustrating example operations of a method of tracking a location of a tracking target device performed by a location tracking sever according to an embodiment.

FIG. 4 is a flowchart illustrating example operations of a method of tracking a location of a tracking target device performed by a location tracking sever according to an embodiment.

In the following embodiments, operations may be performed sequentially, but not necessarily sequentially. For example, the order of the operations may change, and the operations may be performed in parallel. Operations 410 to 440 may be performed by at least one component (e.g., the processor 162 of FIG. 1B) of the location tracking server (e.g., the location tracking server 108 of FIG. 1B).

In operation 410, the location tracking server may collect identification information of the tracking target device and partial (or portions of) location information of electronic devices that receive a tracking request signal from the tracking target device (e.g., the tracking target device 106 of FIG. 1A). The partial (or portions of) location information to be collected may include information that is geometrically ambiguous, by itself. This can include only one of latitude information and longitude information of each of the electronic devices. Alternatively, this can include distance information from only one GPS satellite. However, the partial or portions of the location information, when combined provides an unambiguous location. Accordingly, the location tracking server collects different portions of the location information from electronic devices that are proximate to each other. Accordingly, the different portions when combined will unambiguously provide a location.

In operation 420, the location tracking server may determine whether a request to identify location information of the tracking target device is received from an owner terminal (e.g., the owner terminal 109 of FIG. 1B) of the tracking target device.

In response to receiving the request to identify the location information of the tracking target device from the owner terminal of the tracking target device, in operation 430, the location tracking server may estimate a location of the tracking target device based on the collected identification information and the partial location information. The request to identify the location information of the tracking target device may include identification information of the tracking target device sought by the owner, and the location tracking server may estimate a latitude and longitude at which the tracking target device corresponding to the identification information is located based on latitude information or longitude information received from each of the electronic devices. The location tracking server may estimate the latitude and longitude at which the tracking target device is located based on latest obtained latitude information and latest obtained longitude information among the collected partial location information corresponding to the identification information of the tracking target device.

In an embodiment, in case of receiving location information from only one of the electronic devices, the location tracking server may wait until it receives partial location information from another electronic device.

In operation 440, the location tracking server may provide the location information of the tracking target device to the owner terminal of the tracking target device. The location tracking server may provide the location information of the tracking target device, for example, by marking a location at which the tracking target device is located on a map.

The descriptions referring to FIGS. 1A to 3 may apply to the operations illustrated in FIG. 4, and thus further detailed descriptions are not provided.

Figure 5A:
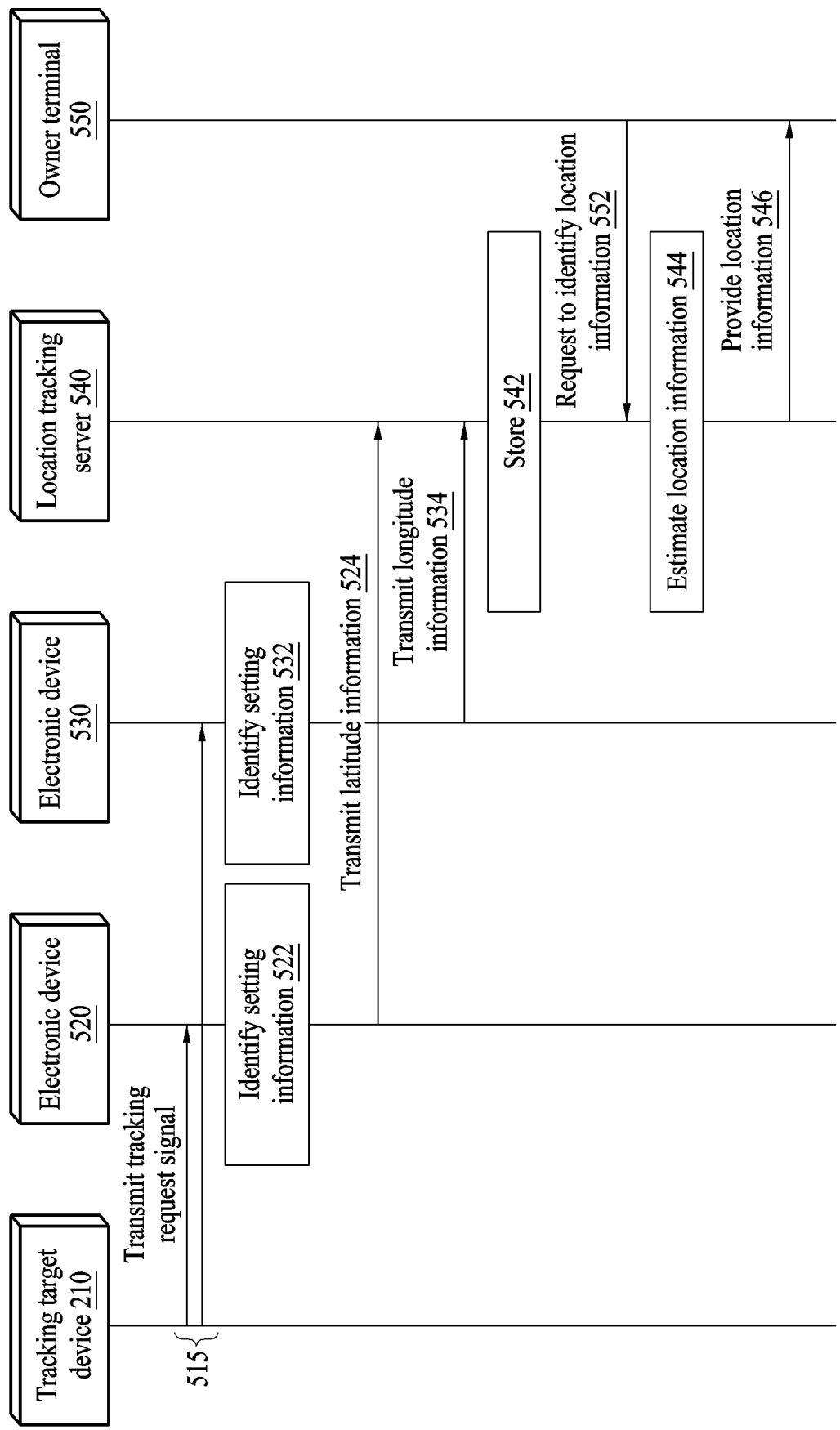
FIG. 5A is a diagram illustrating an example of providing location information of a tracking target device to an owner terminal of the tracking target device according to an embodiment.

FIG. 5A is a diagram illustrating an example of providing location information of a tracking target device to an owner terminal of the tracking target device according to an embodiment.

Referring to FIG. 5A, the tracking target device 210 (e.g., the tracking target device 106 of FIG. 1A) may transmit 515 a tracking request signal to surroundings. For example, the tracking target device 210 may generate and radiate a BLE signal, to the surroundings, to request tracking of the tracking target device 210.

Electronic devices 520 and 530 located near the tracking target device 210 may receive a tracking request signal transmitted by the tracking target device 210. The electronic device 520 may identify 522 setting information related to providing location information in response to receiving the tracking request signal. In the present embodiment, if the mode of the setting information of the electronic device 520 is set to a mode in which the electronic device 520 provides latitude information, the electronic device 520 may identify latitude information and longitude information of its location via a GNSS sensor and transmit 524 the latitude information to a location tracking server 540 (e.g., the location tracking server 108 of FIGS. 1A and 1B) according to the identified setting information. Here, the electronic device 520 may transmit, to the location tracking server 540, not only the latitude information but also identification information of the tracking target device 210 extracted from the tracking request signal and time information indicating a time when the latitude information is obtained.

The electronic device 530 may also identify 532 setting information related to providing location information in response to receiving the tracking request signal. In the present embodiment, if the mode of the setting information of the electronic device 530 is set to a mode in which the electronic device 530 provides longitude information, the electronic device 530 may identify latitude information and longitude information of its location via the GNSS sensor and transmit 534 the longitude information to the location tracking server 540 according to the identified setting information. Here, the electronic device 530 may transmit, to the location tracking server 540, not only the longitude information but also the identification information of the tracking target device 210 extracted from the tracking request signal and time information indicating a time when the longitude information is obtained.

The location tracking server 540 may store 542 the latitude information of the electronic device 520 received from the electronic device 520 and the longitude information of the electronic device 530 received from the electronic device 530 in a memory (e.g., the memory 164 of FIG. 1B). When an owner terminal 550 (e.g., the owner terminal 109 of FIG. 1B) of the tracking target device 210 transmits a request 552 to the location tracking server 540 to identify location information of the tracking target device 210, the location tracking server 540 may estimate 544 the location information of the tracking target device 210 based on the stored partial location information of the electronic devices 520 and 530. For example, the location tracking server 540 may estimate location information, which is obtained by combining the latitude information of the electronic device 520 and the longitude information of the electronic device 530, to be the location information of the tracking target device 210. Then, the location tracking server 540 may provide 546 the owner terminal 550 with the estimated location information of the tracking target device 210.

Although the foregoing embodiment used two electronic devices 520, 530, and latitude and longitude information, another embodiment can use three or more electronic devices. At 524 and 534, each electronic device can provide its distance from only one, but different ones of GPS satellites that are in view.

Figure 5B:
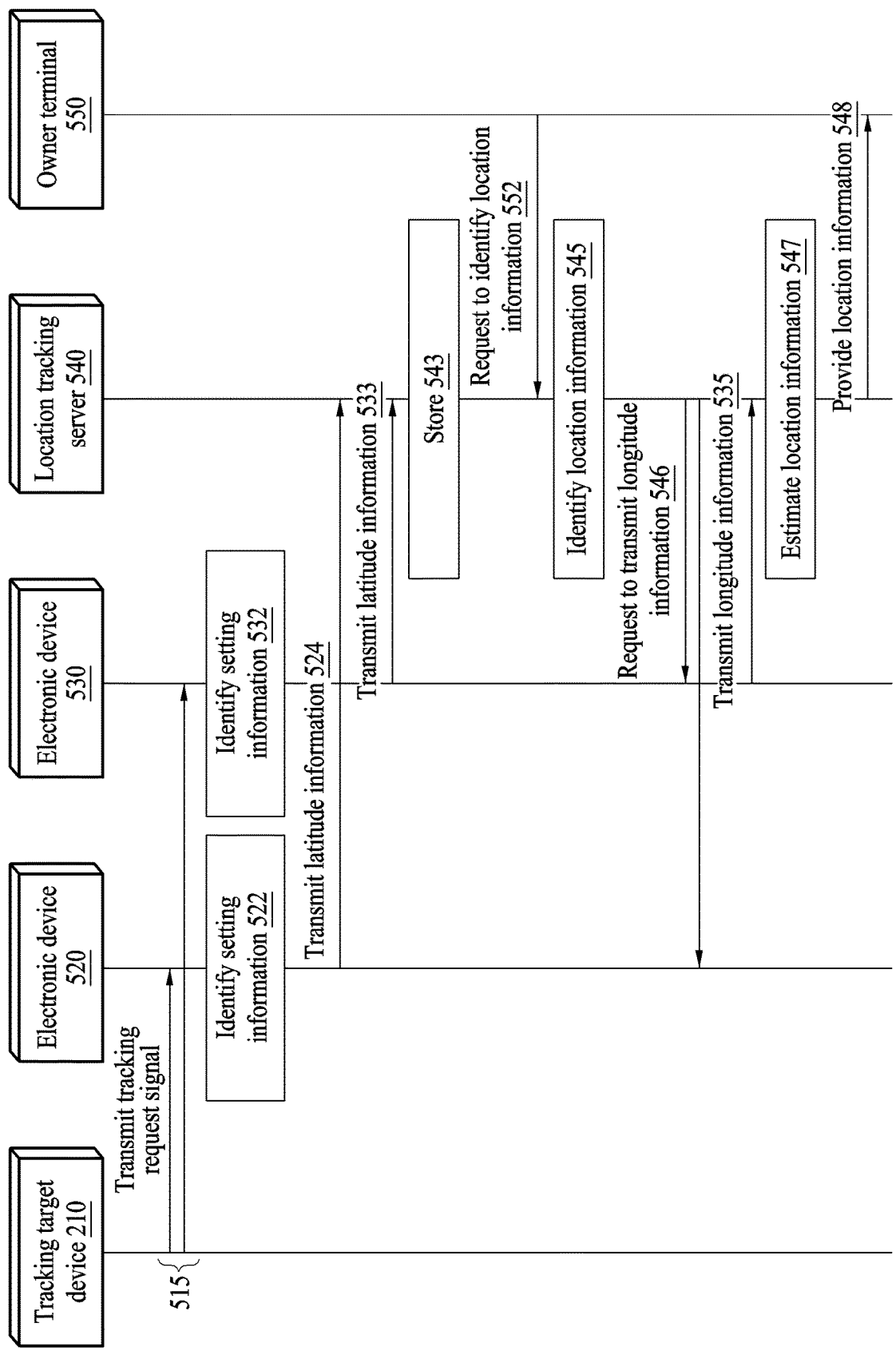
FIG. 5B is a diagram illustrating another example of providing location information of a tracking target device to an owner terminal of the tracking target device according to an embodiment.

FIG. 5B is a diagram illustrating another example of providing location information of a tracking target device to an owner terminal of the tracking target device according to an embodiment.

In an embodiment, in response to the partial location information received from each of the electronic devices 520 and 530 being latitude information, the location tracking server 540 may transmit a request to the electronic devices 520 and 530 to transmit longitude information of the electronic device 520 and 530. Alternatively, in response to the partial location information received from each of the electronic devices 520 and 530 being longitude information, the location tracking server 540 may transmit a request to the electronic devices 520 and 530 to transmit latitude information of the electronic device 520 and 530. In response to receiving a request to transmit latitude information or longitude information from the location tracking server 540, the electronic devices 520 and 530 may determine whether to transmit, to the location tracking server 540, the latitude information or the longitude information requested by the location tracking server 540 based on the setting information. In response to the mode of the setting information of an electronic device being set to random provision mode, the electronic device may transmit, to the location tracking server 540, latitude information or longitude information requested by the location tracking server 540. If the mode of the setting information is set to a latitude information provision mode and the electronic device receives a request to transmit the longitude information from the location tracking server 540, the electronic device may ignore the request to transmit the longitude information. In addition, if the mode of the setting information is set to a longitude information provision mode and the electronic device receives a request to transmit the latitude information from the location tracking server 540, the electronic device may ignore the request to transmit the latitude information.

The descriptions of the transmitting 515 of the tracking request signal and the identifying 522 and 532 of the setting information of each of the electronic devices 520 and 530 referring to FIG. 5A may also apply to FIG. 5B, and thus repeated descriptions are not provided. In the present embodiment, if the mode of the setting information of the electronic device 520 is set to a latitude information provision mode and the mode of the setting information of the electronic device 530 is set to a random provision mode, the electronic device 520 may transmit 524 the latitude information of the electronic device 520 to the location tracking sever 540 according to the set latitude information provision mode. Supposing it is determined that the electronic device 530 shall transmit the latitude information according to the set random provision mode, the electronic device 530 may transmit 533 the latitude information of the electronic device 530 to the location tracking server 540.

The location tracking server 540 may store 543 the latitude information of the electronic device 520 received from the electronic device 520 and the latitude information of the electronic device 530 received from the electronic device 530 in a memory (e.g., the memory 164 of FIG. 1B). When the owner terminal 550 of the tracking target device 210 transmits a request 552 to the location tracking server 540 to identify the location information of the tracking target device 210, the location tracking server 540 may identify 545 the stored location information of the tracking target device 210 to determine whether both the latitude and the longitude information to track the location of the tracking target device 210 has been collected. If only latitude information to track the location of the tracking target device 210 has been collected and no longitude information has been collected, the location tracking server 540 may transmit a request 546 to the electronic devices 520 and 530 to transmit their longitude information.

The electronic devices 520 and 530 that receive the request to transmit the longitude information from the location tracking server 540 may determine whether to transmit the longitude information to the location tracking server 540 based on a setting mode related to providing location information. In the present embodiment, if the mode of the electronic device 520 is set to the latitude information provision mode, the electronic device 520 may ignore the request to transmit the longitude information from the location tracking server 540 and may not provide the longitude information of the electronic device 520 to the location tracking sever 540. Meanwhile, if the mode of the electronic device 530 is set to the random information provision mode, the electronic device 530 may transmit 535 the longitude information of the electronic device 530 to the location tracking server 540 in response to the request to transmit the longitude information from the location tracking server 540.

The location tracking server 540 may combine latest latitude information of the latitude information received from the electronic devices 520 and 530 and the longitude information received from the electronic device 530 to estimate 547 the location information of the tracking target device 210. Then, the location tracking server 540 may provide 548 the estimated location information of the tracking target device 210 to the owner terminal 550. FIGS. 6A and 6B are diagrams illustrating information transmitted to a location tracking server from an electronic device according to an embodiment.

An adjacent electronic device (e.g., the electronic device 101 of FIG. 1A) that receives a tracking request signal from a tracking target device (e.g., the tracking target device 106 of FIG. 1A) may transmit part of its location information to the location tracking server (e.g., the location tracking server 108 of FIG. 1A). The electronic device may extract an ID ("PrivacyId" in FIGS. 6A and 6B) of the tracking target device from the tracking request signal and transmit, to the location tracking server, transmission data including identification information of the ID, location information corresponding to any one of latitude information and longitude information of the electronic device, and time information indicating a time when the location information is obtained. The electronic device may determine a type of location information to be transmitted to the location tracking server based on setting information related to providing location information.

In response to the mode of the setting information being set to a latitude information provision mode, the electronic device may generate data as illustrated in FIG. 6A and transmit the data to the location tracking server. The data may include "PrivacyId" (e.g., "ABCDEFG") indicating the ID of the tracking target device, "latitude" (e.g., "37.2588296") indicating latitude coordinates of the electronic device, and "time" (e.g., "2021-07-20, 09:20") indicating a time when the latitude coordinates are obtained. With the mode of the setting information set to the latitude provision mode, longitude coordinates indicating where the electronic device is located may not be included in data to be transmitted to the location tracking server. In this case, in the data to be transmitted to the location tracking server, "longitude" indicating the longitude coordinates may be set to a null value or may be set to a dummy value or a random value that may not be recognized as a location value.

In response to the mode of the setting information being set to a longitude information provision mode, the electronic device may generate data as illustrated in FIG. 6B and transmit the data to the location tracking server. The data may include "PrivacyId" (e.g., "ABCDEFG") indicating the ID of the tracking target device, "longitude" (e.g., "127.056289") indicating longitude coordinates of the electronic device, and "time" (e.g., "2021-07-20, 09:25") indicating a time when the longitude coordinates are obtained. With the mode of the setting information set to the longitude provision mode, the latitude coordinates indicating where the electronic device is located may not be included in the data to be transmitted to the location tracking server. In this case, in the data to be transmitted to the location tracking server, "latitude" indicating the latitude coordinates may be set to a null value or may be set to a dummy value or a random value that may not be recognized as a location value.

If the mode of the setting information is set to the random provision mode, the electronic device may randomly determine whether to generate data including latitude information as shown in FIG. 6A or data including longitude information as shown in FIG. 6B.

Therefore, the electronic device may transmit, to the location tracking server, less data by transmitting only one of latitude information and longitude information to the location tracking server instead of transmitting both the latitude information and longitude information.

Figure 7:
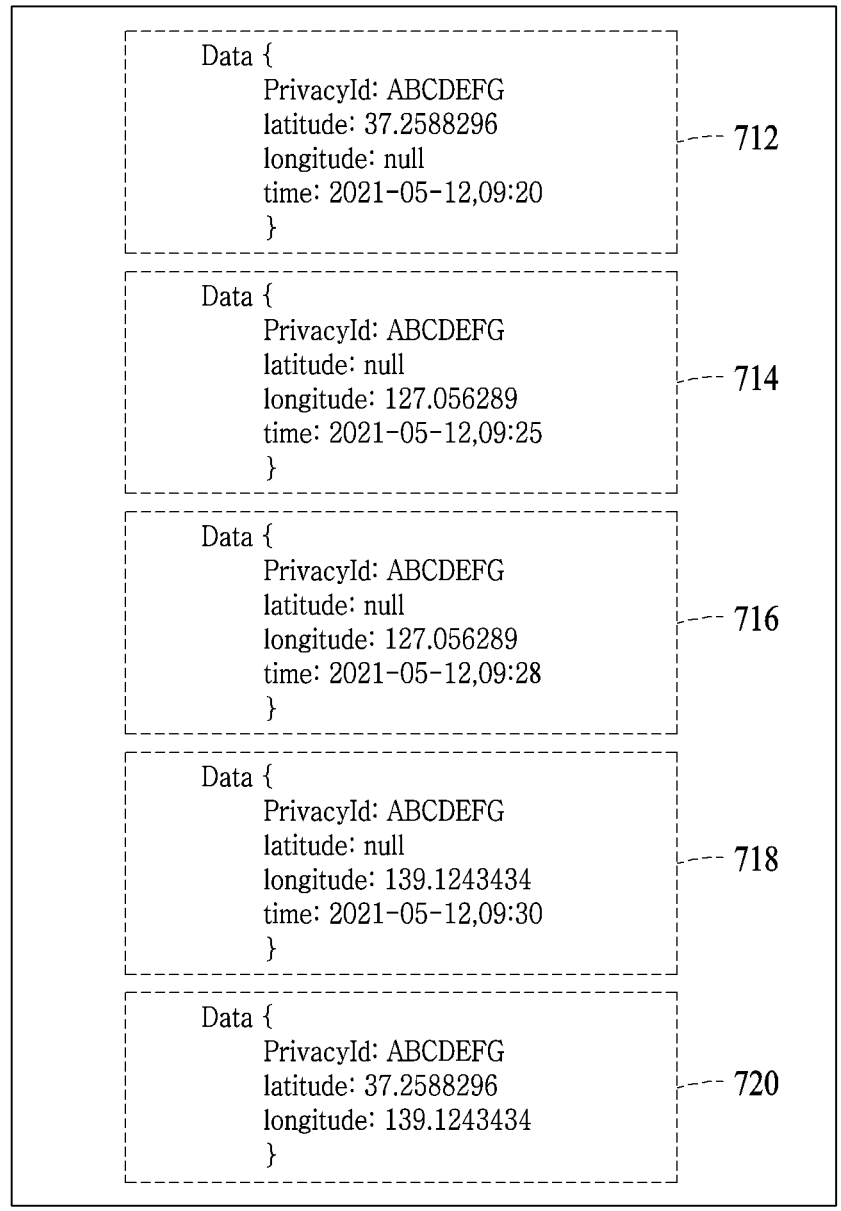
FIG. 7 is a diagram illustrating an example of determining location information of a tracking target device according to an embodiment.

FIG. 7 is a diagram illustrating an example of determining location information of a tracking target device according to an embodiment.

Referring to FIG. 7, a location tracking server (e.g., the location tracking server 108 of FIGS. 1A and 1B) may collect data including partial location information from multiple electronic devices that receive a tracking request signal from the tracking target device. The location tracking server may extract an ID of the tracking target device from the data received from the electronic devices and may continually store location information based on the extracted ID. At a time when an owner of the tracking target device makes an inquiry about a location of the tracking target device, the location tracking server may estimate location information of the tracking target device based on latest collected location information.

For example, as illustrated in FIG. 7, assuming a plurality of pieces of data 712, 714, 716, and 718 is received from the electronic devices to track the location of the tracking target device of which "PrivacyId" indicating an ID is "ABCDEFG" and the owner of the tracking target device corresponding to "ABCDEFG" makes a request to find the location of the tracking target device after receiving latest data 718, the location tracking server may combine a latitude "37.2588296" of data 712 including latest latitude information and a longitude "139.1243434" of the data 718 including latest longitude information based on time information included in data to generate final location data 720 of the tracking target device "ABCDEFG" including location information of the latitude "37.2588296" and the longitude "139.1243434". The location tracking server may provide the generated final location data 720 of the tracking target device "ABCDEFG" to the owner of the tracking target device "ABCDEFG".

According to certain embodiments, an electronic device comprises: a communication module configured to perform wireless communication; a location sensor; a processor; and a memory configured to store at least one instruction executable by the processor, wherein execution of the at least one instruction by the processor causes the processor to perform a plurality of operations comprising: receiving, from a tracking target device, a tracking request signal, the tracking request signal comprising identification information of a tracking target device via the communication module; obtaining location information of the electronic device via the location sensor; and transmitting, to a location tracking server, the identification information of the tracking target device and only one of latitude information and longitude information comprised in the location information via the communication module.

According to certain embodiments, the only one of the latitude information and the longitude information that is transmitted is based on a setting information of the electronic device.

According to certain embodiments, the plurality of operations further comprises, in response the setting information being set to random provision, randomly selecting the only one of the latitude information and the longitude information to be transmitted to the location tracking server.

According to certain embodiments, the plurality of operations further comprises, in response to receiving a request from the location tracking server, determining whether to transmit the latitude information or the longitude information requested by the location tracking server based on the setting information.

According to certain embodiments, the plurality of operations further comprises, in response to the setting information being set to random provision, transmitting, to the location tracking server, the only one of the latitude information or the longitude information requested by the location tracking server via the communication module.

According to certain embodiments, the plurality of operations further comprises transmitting, to the location tracking server, information indicating a time when the location information is obtained.

According to certain embodiments, the location sensor comprises a global navigation satellite system (GNSS) sensor, and the plurality of operations further comprises, in response to receiving the tracking request signal, obtaining latitude information and longitude information indicating where the electronic device is located via the GNSS sensor.

According to certain embodiments, the electronic device receives the tracking request signal via short-range wireless communication.

According to certain embodiments, a method of tracking a location of a tracking target device, performed by an electronic device, comprises: receiving, from the tracking target device, a tracking request signal comprising identification information of the tracking target device; obtaining location information of the electronic device using a location sensor; and transmitting, to a location tracking server, the identification information of the tracking target device and only one of latitude information and longitude information comprised in the location information.

According to certain embodiments, the transmitting comprises determining the only one of the latitude information and the longitude information to be transmitted to the location tracking server, based on setting information of the electronic device.

According to certain embodiments, the determining comprises, in response to the setting information being set to a random provision, randomly selecting the only one of the latitude information and the longitude information to be transmitted to the location tracking server.

According to certain embodiments, the determining comprises, in response to receiving a request from the location tracking server via the communication module, determining whether to transmit the latitude information or the longitude information requested by the location tracking server based on the setting information.

According to certain embodiments, the transmitting comprises, in response to the setting information being set to a random provision, transmitting, to the location tracking server, the only one of the latitude information or the longitude information requested by the location tracking server.

According to certain embodiments, the transmitting comprises transmitting, to the location tracking server, transmission information indicating a time when the location information is obtained.

According to certain embodiments, a method of tracking a location of a tracking target device, performed by a location tracking server, comprises: collecting, from electronic devices configured to receive a tracking request signal from the tracking target device, identification information of the tracking target device and partial location information of the electronic devices; and estimating a location of the tracking target device based on the collected identification information and the partial location information, wherein the partial location information comprises any one of latitude information and longitude information of each of the electronic devices, and the estimating of the location of the tracking target device comprises estimating a latitude and a longitude at which the tracking target device is located based on latitude information or longitude information received from each of the electronic devices.

According to certain embodiments, the estimating of the location of the tracking target device comprises estimating a latitude and a longitude at which the tracking target device is located based on latest obtained latitude information and latest obtained longitude information of the collected partial location information corresponding to the identification information of the tracking target device.

According to certain embodiments, wherein the estimating of the location of the tracking target device comprises, in response to receiving a request to identify location information of the tracking target device from an owner terminal of the tracking target device, estimating a location of the tracking target device.

According to certain embodiments, the method further comprises: requesting from the electronic devices transmission of longitude information of the electronic devices, in response to partial location information received from each of the electronic devices being latitude information; and requesting from the electronic devices transmission of latitude information of the electronic devices, in response to partial location information received from each of the electronic devices being longitude information.

According to certain embodiments, an electronic device configured to receive a request to transmit the latitude information and the longitude information from the location tracking server determines whether to transmit, to the location tracking server, the latitude information or the longitude information requested by the location tracking server based on setting information of the electronic device.

According to certain embodiments, non-transitory computer-readable storage medium storing instructions that, when executed by a processor, cause the processor to perform the described method.

What is claimed is:

1. An electronic device comprising:
a communication module configured to perform wireless communication;
a location sensor;
a processor; and
a memory configured to store at least one instruction executable by the processor, wherein execution of the at least one instruction by the processor causes the processor to perform a plurality of operations comprising:
receiving, from a tracking target device, a tracking request signal, the tracking request signal comprising identification information of a tracking target device via the communication module;
obtaining location information of the electronic device via the location sensor, the location information including latitude information and longitude information;
transmitting, to a location tracking server, the identification information of the tracking target device and the latitude information comprised in the location information via the communication module,
receiving, from the location tracking server, a request to transmit the longitude information; and
in response to receiving the request, transmitting, to the location tracking server, the longitude information comprised in the location information via the communication module.

2. The electronic device of claim 1, wherein at least one of the latitude information and the longitude information that is transmitted is based on a setting information of the electronic device.

3. The electronic device of claim 2, wherein the plurality of operations further comprises, in response to receiving a request from the location tracking server, determining whether to transmit the latitude information or the longitude information requested by the location tracking server based on the setting information.

4. The electronic device of claim 1, wherein the plurality of operations further comprises transmitting, to the location tracking server, information indicating a time when the location information is obtained.

5. The electronic device of claim 1, wherein
the location sensor comprises a global navigation satellite system (GNSS) sensor, and
the plurality of operations further comprises, in response to receiving the tracking request signal, obtaining latitude information and longitude information indicating where the electronic device is located via the GNSS sensor.

6. The electronic device of claim 1, wherein the electronic device receives the tracking request signal via short-range wireless communication.

7. A method of tracking a location of a tracking target device, performed by an electronic device, the method comprising:
receiving, from the tracking target device, a tracking request signal comprising identification information of the tracking target device;
obtaining location information of the electronic device using a location sensor, the location information including latitude information and longitude information;
transmitting, to a location tracking server, the identification information of the tracking target device and the latitude information comprised in the location information,
receiving, from the location tracking server, a request to transmit the longitude information; and
in response to receiving the request, transmitting, to the location tracking server, the longitude information comprised in the location information via a communication module.

8. The method of claim 7, wherein at least one of the latitude information and the longitude information that is transmitted is based on a setting information of the electronic device.

9. The method of claim 8, further comprising:
in response to receiving a request from the location tracking server, determining whether to transmit the latitude information or the longitude information requested by the location tracking server based on the setting information.

10. The method of claim 8, wherein the transmitting comprises transmitting, to the location tracking server, transmission information indicating a time when the location information is obtained.

11. A non-transitory computer-readable storage medium storing instructions that, when executed by a processor, cause the processor to perform the method of claim 7.

12. A method of tracking a location of a tracking target device, performed by a location tracking server, the method comprising:
collecting, from a first electronic devices configured to receive a tracking request signal from the tracking target device, identification information of the tracking target device and latitude information of the first electronic device;
requesting, to the first electronic device, transmission of longitude information of the first electronic device, in response to partial location information received from the first electronic device being the latitude information;
receiving, from the first electronic device, longitude information of the first electronic device; and
estimating a location of the tracking target device based on the latitude information and the longitude information from the first electronic device.

13. The method of claim 12, wherein the estimating of the location of the tracking target device comprises estimating a latitude and a longitude at which the tracking target device is located based on latest obtained latitude information and latest obtained longitude information from the first electronic device.

14. The method of claim 12, wherein the estimating of the location of the tracking target device comprises, in response to receiving a request to identify location information of the tracking target device from an owner terminal of the tracking target device, estimating a location of the tracking target device.

15. The method of claim 12, further comprising:
  requesting, to a second electronic devices transmission of longitude information of the second electronic devices, in response to partial location information received from the first electronic devices being the latitude information.

16. The method of claim 12, wherein the first electronic device is configured to obtain location information of the first electronic device via a location sensor of the first electronic device,
  wherein the location information includes the latitude information and the longitude information.

\* \* \* \* \*